Nov. 5, 1968 E. J. DIEBOLD 3,409,808
HIGH VOLTAGE DIODE FOR LOW PRESSURE APPLICATIONS
Filed March 12, 1965

INVENTOR.
EDWARD J. DIEBOLD
BY
OSTROLENK, FABER, GERB & SOFFEN
ATTORNEYS

3,409,808
HIGH VOLTAGE DIODE FOR LOW PRESSURE APPLICATIONS

Edward J. Diebold, Palos Verdes Estates, Calif., assignor to International Rectifier Corporation, El Segundo, Calif., a corporation of California Filed Mar. 12, 1965, Ser. No. 439,251
10 Claims. (Cl. 317—234)

This invention relates to a construction for rectifier diodes, and more specifically relates to a novel construction for a standard rectifier diode which permits its use in high voltage, low pressure applications.

Rectifier diodes using solid state junctions in silicon or germanium crystals are extremely well known to the art, and have been continuously improved over the years. Thus, these devices were originally built for voltages in the range of 100 volts, and gradually, as techniques for manufacture of the devices have improved, the voltage capability of the devices have been increased to in excess of 1,000 volts.

The package, or metallic case, which contains this diode is presently a standardized component and has been in use for many years. This metallic case is well known, and is termed as a "top hat" construction. This original package operates satisfactorily at the low voltage ratings of which the devices were originally capable, particularly where the device was used at full atmospheric pressure. More recently, however, diodes of this type are being applied not only at higher voltages, but also in high altitude or low atmospheric pressure applications. Under these circumstances, very severe flashover problems have been encountered.

The principal object of this invention is to provide a novel diode package which can operate at high voltage and low atmospheric pressure without electrical flashover.

Yet another object of this invention is to provide a novel external insulation housing for standard rectifier diodes which permits their use in high voltage, low pressure applications.

Still another object of this invention is to provide an insulation sheath over the full surface of a standardized rectifier diode housing, with the exception of the main heat exchange surface of the housing flange.

Yet another object of this invention is to provide full electrical insulation over the surface of a high voltage diode for use with low pressure applications which does not add thermal insulation against heat transfer.

These and other objects of this invention will become apparaent from the following description when taken in connection with the drawings, in which.

Figures 1, 2, 3, 4, 5, 6:
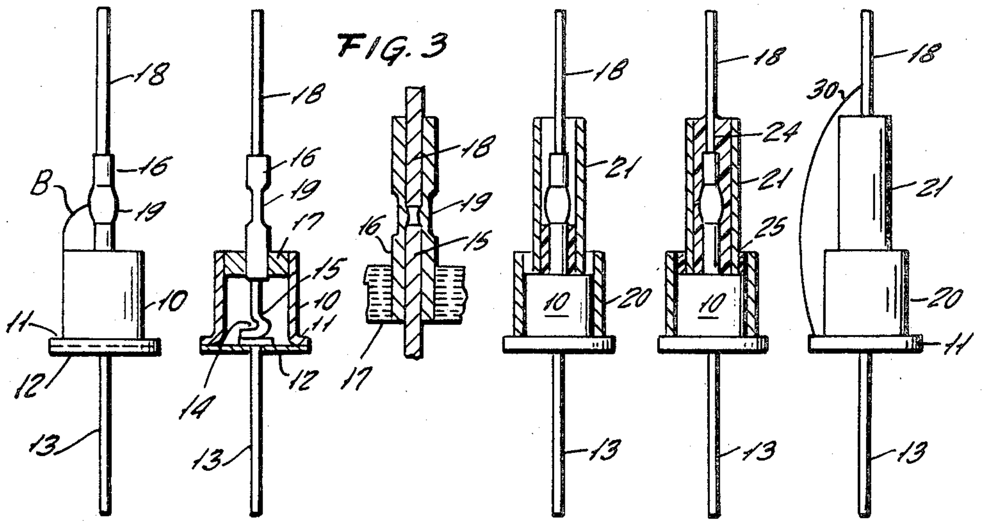
FIGURE 1 is a side view of a typical "top hat" rectifier diode.
FIGURE 2 is a side view of FIGURE 1 partially in cross-section to illustrate the internal construction of the device.
FIGURE 3 is an enlarged view in cross-section of the crimping tube for connecting the lead coming from the wafer of the rectifier diode to an external connection lead.
FIGURE 4 is a partial cross-sectional view of a portion of the insulation sheath provided for the housing of FIGURE 1 in accordance with the invention.
FIGURE 5 illustrates the device of FIGURE 4 after the insulation tubing is filled with an insulation compound.
FIGURE 6 is a plan view of the completed device of FIGURE 5.

Referring first to FIGURES 1, 2 and 3, I have illustrated therein a typical prior art type of "top hat" rectifier diode. More particularly, the device is comprised of an outer conductive housing 10 having an extending flange 11 which is connected to a metallic disk 12. The metallic disk 12 which is connected to flange 11 is electrically connected to a first lead 13. Note that the bottom of disk 12 serves as a heat exchange surface, and might be mounted immediately against some suitable metallic body which will serve as the heat sink for the device.

The upper surface of disk 12 is then connected to a suitable semiconductor wafer 14 (FIGURE 2) which will have a rectifying junction therein. The upper surface of wafer 14 is then connected to a suitable internal lead 15, and the lead 14 then extends into a metallic tube 16.

The metallic tube 16 is rigidly secured to an annular insulation ring 17 which could be a glass bead, and serves to provide the insulation between the two electrical terminals of the device.

The metallic tube 16 then receives an external lead 18 in the other end thereof which is of material suitable for an external lead connector, and the leads 15 and 18 are mechanically and electrically connected together by a crimp 19 placed in the tube 16.

In considering the diode of FIGURES 1, 2 and 3, under conditions of normal atmospheric pressure, the flashover at atmospheric pressure is characterized by the very good insulating properties of air. Thus, theoretically, 0.03 centimeters of flashover distance is sufficient to hold voltages up to 1,000 volts. As a practical matter, this distance is too short, and, for example, in the diode of FIGURES 1, 2 and 3, the radial dimension over the surface of the insulation bead 17 will be approximately 0.14 centimeters, which is approximately five times more than the theoretical minimum.

However, another insulation problem exists other than direct flashover in the standard type of diode of FIGURES 1, 2 and 3 at full atmospheric pressure. Thus, the exposed surface of insulator 17 is exposed to atmospheric contaminants such as dust, humidity, chemically aggressive vapors, and so on, which could produce a breakdown path along the surface of the insulator. For this reason, the insulating distance traditionally provided in such diodes is too short and are acceptable only because the diodes are not normally used at their maximum voltage rating, but are used at approximately ⅓ to ½ of their rating.

Since, however, these distances are too short, it has been common practice by users of diodes to apply an insulation sleeve surrounding the diode casing 10 to prevent contaminants from coating the upper insulation surface of bead 17.

If now this same diode, whether bare or with an insulating sleeve, is taken down to a low pressure such as 8 millimeters of mercury, corresponding, for example, to very high altitudes, it has been found that the diode will flash over externally, as indicated by line B in FIGURE 1. This flashover arc does not follow across the surface of insulator bead 17, but rather extends in a relatively straight line between two sharp corners, one of which is formed by the rim of the insulated case of the diode and the other which is formed by the flattened crimp 19. Indeed, and even where the diode is provided with an insulation sleeve over surface 17, and even where the sleeve shrinks closely to the diode surface, it has been found that this arc will nevertheless flash over inside of the sleeve. If the sleeve is tightly fitted, this flashover has been found to occur several seconds after the voltage is applied. The observed minimum flashover voltage is further found to be very low compared to the flashover voltage under atmospheric pressure.

Figure 7:
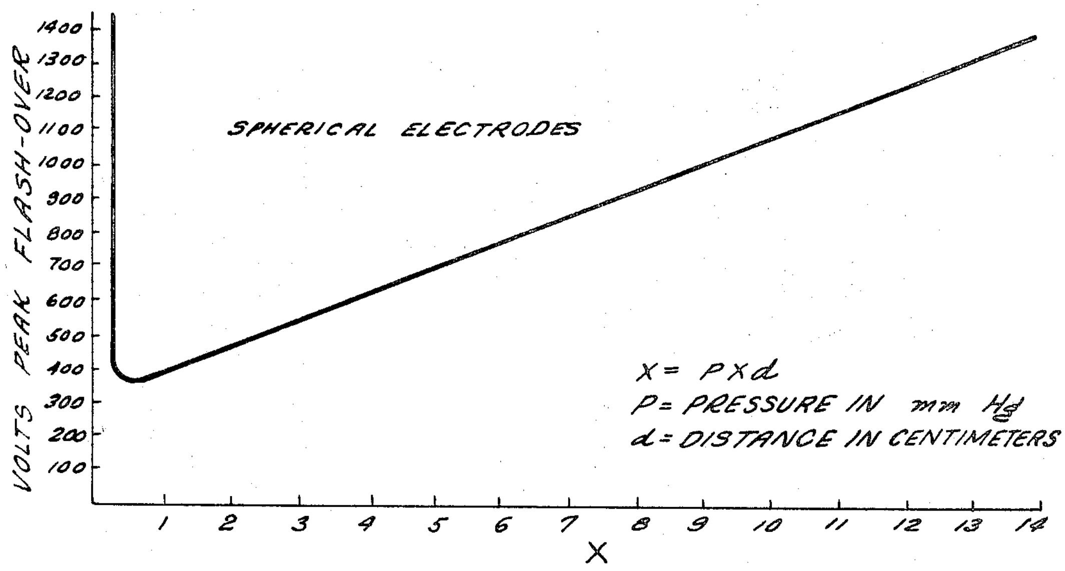
FIGURE 7 illustrates peak voltage flashover as a function of the product of pressure times the spacing between two spherical electrodes.

This behaviour can be expected from Paschens Law, which is illustrated in FIGURE 7. More particularly, and for example, for two spherical electrodes spaced from one another in air, the flashover voltage will vary as a function of the product of air pressure and distance, where the pressure is expressed in millimeters of mercury and the distance between the electrodes is expressed in centimeters.

Thus, if a certain voltage must be held with certainty such as 1,000 volts, and 1,400 volts is the minimum actual flashover voltage, the product X of pressure times distance must be 14.

For present-day high altitude aircraft, the minimum pressure encountered will be of the order of 8 millimeters of mercury, which is approximately 1% of normal atmospheric pressure. Thus, this corresponds to a distance of 1.75 centimeters between spherical electrodes.

The distance between the flashover points in FIGURE 1, however, is not nearly this distance, and indeed is only of the order of 0.14 centimeters, so that at low pressure, the normal diode package would be too small and indeed would still be too small even if it were entirely made of insulation material. That is to say, even if the complete housing 10 were of insulation material, its length would still be substantially less than the required length of 1.75 centimeters.

It should be noted that for even higher altitudes, and where the pressure is still lower, regardless of the spacing between electrodes, there is a minimum voltage of approximately 360 volts where flashover will occur whenever the variable X of FIGURE 7 is of the order of 0.5. Thus, for the travel between atmosphere and outer space, there is a region within which any insulation will flash over externally regardless of how long the flashover distance is made, so long as the voltage is higher than 360 volts. This problem can be overcome only by completely immersing the high voltage system in an insulating medium, either liquid or solid, so that no atmosphere can reach the electrically live parts.

In accordance with the invention, a novel arrangement is provided for surrounding the external surfaces of the standardized "top hat" type device so that the device can operate at low pressures without the problem of flashover discussed heretofore.

More specifically, and as shown in FIGURES 4, 5 and 6, two thin walled insulation tubes 20 and 21 surround the housing portion 10 and the metallic tube 16 and portions of conductor 18, respectively. Note that tube 21 is longer than tube 20 so that the insulation will extend for a substantial length along the lead 18 as compared to prior art dust caps, which terminate at the end of housing 10. Tubes 20 and 21 could have a thickness, for example, of 0.05 centimeters, and can be formed of a suitable epoxy material for use with a rectifier diode type IN561, as standardized by the Joint Electron Device Engineering Council (JEDEC). Note that the tube 20 extends above the upper surface of casing 10 by approximately 0.2 centimeters. This distance is not critical, but it should extend sufficiently beyond the upper surface to define a reservoir between the upper surface of housing 10 and the end of tube 20 which can be later filled with an insulation material.

The tubes 20 and 21 are initially fastened to the metallic parts by small amounts of a suitable liquid epoxy cement which flows by capillary action between the solid epoxy tube and the metal. Thus, in FIGURE 4, a thin layer of epoxy cement 22 secures tube 20 to housing 10, while a small amount of epoxy cement 23 secures tube 22 to the conductive tube 16 and housing 10.

The diode is then baked in the upright position shown, at a temperature suitable to solidfy the epoxy adhesive layers 22 and 23. After baking, the empty spaces are filled with additional amounts of a liquid epoxy, shown in FIGURE 5, by epoxy fillings 24 and 25 so that the entire tube 21 is filled, and in a similar manner, the tube 20 is filled to the top thereof. This liquid will then fill all the crevices between the insulation tubes 20 and 21, and will not be able to flow out of the bottom of the tubes by virtue of their prior securement step described in FIGURE 4.

After the second filling operation of FIGURE 5, the structure is then cured at a suitable elevated temperature to solidify all of the epoxy around the metal parts so that a voidless insulation is created.

The dimensions of tubes 20 and 21 are so chosen as to use the maximum allowable space provided by the standardized permissible diode dimension outlines. Thus, the distance between the metal parts of different dimensions is deliberately extended beyond the diode so that a long flashover distance is created.

By way of example, and in the arrangement of FIGURES 4, 5 and 6, tests have shown that the diode will flash over, as indicated by line 30, from the beginning of the exposed lead 18 to the flange 11 which is a distance of the order of 1.75 centimeters. Thus, the method of manufacture used and described in FIGURES 4, 5 and 6 has the advantage that the entire space between the epoxy tubes tubes 20 and 21 and the metal is completely filled by liquid epoxy so that internal arcs between metal and insulation cannot occur. Moreover, and because the tubes 20 and 21 are of solid epoxy, and are bonded by a solidified similar epoxy, the materials are compatible with one another and do not tend to separate during thermal cycling.

Furthermore, the tubes and the liquid epoxy used are inexpensive, and can be applied to the metal parts of the standard diode without prior alterations so that standard manufacturing methods up to the finished diode can be utilized.

As an important feature of the invention, and as shown in FIGURE 6, the novel structure of the invention still has the exposed metallic flange 11 available for heat dissipation as by soldering or clamping to a chassis or piece of electronic equipment. Thus, the electrical insulation is provided only on those parts of the diode where its presence does not add thermal insulation against heat transfer.

Figure 8:
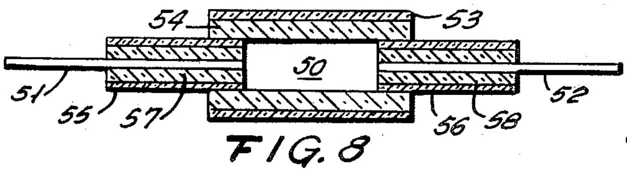
FIGURE 8 shows a second embodiment of the present invention in partial cross-sectional view.

The foregoing description of the invention is made in connection with "top hat" diodes where the advantage of an exposed metallic surface for heat exchange is retained. However, the invention is also generally applicable to tubular electrical components such as flangeless diodes having a metallic case, or glass diodes where the leads of the device extend from the opposite ends of the device. A typical arrangement of this type is shown in FIGURE 8 where a flangeless diode housing 50 having leads 51 and 52 is shown in plan view. The additional insulation length is added to the device, as shown in cross-section, and in accordance with the invention. Thus, the housing 50 is surrounded by an insulation tube 53 which overlaps the ends of housing 50. It is then cemented to housing 50 by an epoxy cement coating 54. Each of leads 51 and 52 is also surrounded by insulation cylinders 55 and 56, respectively, which are cemented to the opposite surfaces of housing 50 and fit into the reservoirs defined at the ends of housing 50 by the tub 53. Thereafter, epoxy cement fillings 57 and 58 are filled into the tubes 55 and 56, as shown, where epoxy cement portions 54, 57 and 58 may be of a material identical to tubes 53, 55 and 56. Note that with this structure, a flashover path must extend from the outer ends of tubes 55 and 56, respectively.

Although this invention has been described with respect to its perferred embodiments, it should be understood that many variations and modifications will now be obvious to those skilled in the art, and it is preferred, therefore, that the scope of the invention be limited not by the specific disclosure herein, but only by the appened claims.

The embodiments of the invention in which an exclusive privilege or property is claimed are defined as follows:

1. A high voltage diode comprising a housing body for housing and completely enclosing a semiconductor wafer, a conductive end member connected across one end of said housing body and extending beyond the periphery of said housing body to define an end flange; an extending lead extending from the other end of said housing body and connected to a first portion of said semiconductor wafer; a second portion of said semiconductor wafer connected to said conductive end member; and an insulation sheath; said insulation sheath having a generally tubular shape and surrounding said housing body and said extending lead; a first end of said insulation sheath being directly secured to the surface of said flange facing said housing body; the other end of said sheath being directly connected to and around said extending lead; the interior surface of said insulation sheath being intimately secured to the adjacent exterior surfaces of said housing body and said extending lead.

2. The device substantially as set forth in claim 1 wherein said insulation sheath has a length of approximately 1.75 centimeters.

3. The device substantially as set forth in claim 1 wherein the length of said tubular insulation sheath adjacent said lead is no longer than the length of said tubular insulation sheath adjacent said housing body.

4. The device substantially as set forth in claim 1 wherein said housing body includes a conductive cylindrical portion having an annular insulation bead at one end thereof; said lead extending through said insulation bead and being secured thereto.

5. The device substantially as set forth in claim 1 wherein said insulation sheath comprises a first and second insulation tube and an insulation filler; said first insulation tube surrounding said housing body and extending above the end thereof to define a reservoir between the upper end of said first tube and the top of said housing body; said second tube surrounding said lead and having a smaller diameter than said first tube; the bottom end of said second tube extending into said reservoir formed at the top of said housing body, said insulation filler filling the spaces between the interior surfaces of said first and second tubes and said housing body and lead, respectively, and filling said reservoir.

6. The device substantially as set forth in claim 5 wherein said first and second tubes and said filler are comprised of epoxy compounds.

7. The device substantially as set forth in claim 5 wherein said insulation sheath has a length of approximately 1.75 centimeters.

8. A high voltage electrical component comprising a cylindrical housing structure having a lead structure extending from an axially located portion of one end of said housing; and an insulation sheath comprising a first insulation tube surrounding said cylindrical housing and extending beyond the said one end of said housing, a second insulation sheath surrounding said lead and having one end thereof abutting against said one end of said housing, and an insulation filler medium; the interior surfaces of said first and second insulation tubes being radially spaced from the exterior surfaces of said housing and lead, respectively; said first insulation tube having a larger diameter than said smaller diameter; said insulation filler filling the spaces between said insulation tubes and their said respective housing and lead, and filling the space defined by said first insulation tube extending beyond said one end of said housing.

9. The device substantially as set forth in claim 8 wherein said first and second tubes and said filler are comprised of epoxy compounds.

10. The device substantially as set forth in claim 8 wherein said insulation sheath has a length of approximately 1.75 centimeters.

References Cited

UNITED STATES PATENTS

| | | | |
|---|---|---|---|
| 2,820,929 | 1/1958 | Coy | 317—234 |
| 2,888,736 | 6/1959 | Sardella | 29—25.3 |
| 3,226,610 | 12/1965 | Harman et al. | 317—234 |
| 3,239,595 | 3/1966 | Reese et al. | 174—52 |
| 3,252,060 | 5/1966 | Marino et al. | 317—234 |
| 3,256,469 | 6/1966 | Neuber et al. | 317—235 |
| 3,257,621 | 6/1966 | Jadoul | 330—23 |
| 3,296,506 | 1/1967 | Steinmetz et al. | 317—234 |
| 3,193,707 | 7/1965 | Yanai | 307—88.5 |

JOHN W. HUCKERT, *Primary Examiner.*

R. F. SANDLER, *Assistant Examiner.*